(12) United States Patent
Singh et al.

(10) Patent No.: US 8,623,808 B2
(45) Date of Patent: *Jan. 7, 2014

(54) COMPOSITIONS CONTAINING TETRAFLUOROPROPENE AND CARBON DIOXIDE

(75) Inventors: Rajiv R. Singh, Getzville, NY (US); Hang T. Pham, Amherst, NY (US); Ian Shankland, Randolph, NY (US)

(73) Assignee: Honeywell International Inc., Morristown, NJ (US)

(*) Notice: Subject to any disclaimer, the term of this patent is extended or adjusted under 35 U.S.C. 154(b) by 28 days.

This patent is subject to a terminal disclaimer.

(21) Appl. No.: 13/204,428

(22) Filed: Aug. 5, 2011

(65) Prior Publication Data
US 2011/0289748 A1    Dec. 1, 2011

Related U.S. Application Data

(60) Division of application No. 12/558,099, filed on Sep. 11, 2009, now Pat. No. 8,053,404, and a division of application No. 11/118,833, filed on Apr. 29, 2005, now Pat. No. 7,629,306, and a continuation-in-part of application No. 10/837,521, filed on Apr. 29, 2004, now Pat. No. 7,655,610.

(51) Int. Cl.
*C11D 7/50*    (2006.01)

(52) U.S. Cl.
CPC .................................. *C11D 7/5063* (2013.01)
USPC ................ 510/408; 510/412; 252/67; 252/68

(58) Field of Classification Search
USPC ................. 510/408, 412; 252/67, 68
See application file for complete search history.

(56) References Cited

U.S. PATENT DOCUMENTS

| 3,723,318 | A | 3/1973 | Butler |
| 4,788,352 | A | 11/1988 | Smutny |
| 5,611,210 | A | 3/1997 | Nimitz et al. |

(Continued)

FOREIGN PATENT DOCUMENTS

| DE | 4116274 A1 | 11/1992 |
| EP | 0398147 A2 | 11/1990 |
| EP | 0864554 A1 | 9/1998 |
| JP | 04-110388 A | 4/1992 |

OTHER PUBLICATIONS

Akasaka et al., Fundamental Equation of State for 2,3,3,3-Tetrafluoropropene (HFO-1234yf), (Article) pp. 1-4 (undated) (JP).

(Continued)

*Primary Examiner* — Gregory Webb
(74) *Attorney, Agent, or Firm* — Colleen D. Szuch

(57) ABSTRACT

Disclosed are compositions useful in a wide variety of applications, including heat transfer fluids which possess a highly desirable and unexpectedly superior combination of properties, and heat transfer systems and methods based on these fluids. The preferred heat transfer fluid comprises from about 1 to about 40 percent, on a weight basis, of carbon dioxide ($CO_2$) and from about 99 to about 60 percent, on a weight basis, of a compound having the Formula I $XCF_zR_{3-z}$ (I), where X is a $C_2$ or a $C_3$ unsaturated, substituted or unsubstituted, alkyl radical, each R is independently Cl, F, Br, I or H, and z is 1 to 3. A preferred compound of Formula I is tetrafluoropropene, particularly 1,1,1,3-tetrafluoropropene and/or 1,1,1,3-tetrafluoropropene.

19 Claims, 8 Drawing Sheets

Bubble Point and Dew Point Pressures – transHFO-1234ze and $CO_2$

(56) References Cited

U.S. PATENT DOCUMENTS

| | | | |
|---|---|---|---|
| 6,041,621 A | 3/2000 | Olszewski et al. | |
| 6,076,372 A | 6/2000 | Acharya et al. | |
| 6,260,380 B1 | 7/2001 | Arman et al. | |
| 6,695,973 B1 | 2/2004 | Musso et al. | |
| 6,783,691 B1 | 8/2004 | Bivens et al. | |
| 6,991,744 B2 | 1/2006 | Mahler et al. | |
| 7,105,152 B1 | 9/2006 | Schultz et al. | |
| 7,629,306 B2 * | 12/2009 | Shankland et al. | 510/408 |
| 7,655,610 B2 * | 2/2010 | Singh et al. | 510/408 |
| 8,053,404 B2 * | 11/2011 | Singh et al. | 510/408 |

OTHER PUBLICATIONS

C.J. Morrissey, Technical Support Package on "Nearly Azeotropic Mixtures To Replace Refrigerant 12," NASA Tech Brief, vol. 16, No. 8, Item 22, pp. 1-42, Aug. 1992 (US).

Downing et al., "Fluorocarbon Refrigerants Handbook," Prentice Hall, Inc. pp. 134 and 139 (1988) US.

Konzo, et al., "Winter Air Conditioning," The Industrial Press, NY (Univ. of Illinois) pp. 590-596 (1958) (US).

McLinden et al., "Quest for Alternatives: A molecular approach demonstrates tradeoffs and limitations are inevitable in seeking refrigerants," ASHERAE Journal, pp. 32-42, Dec. 1987 (US).

Orkin, et al., "Rate Constants for the Reactions of OH with HFC-245cb ($CH_3CF_2CF_3$) and Some Fluoroalkenes," J. Phys. Chem A., vol. 101, pp. 9118-9124 (1997).

Proposal for a Regulation of the European Parliament and of the Council on Certain Fluorinated Greenhouse Gases, pp. 22-42 (2003) EU.

Regulation (EC) No. 842/2006 of the European Parliament and of the Council on Certain Fluorinated Greenhouse Gases, May 17, 2006, p. 1-11 (EU).

Singh et al., "Low Global Warming Fluorocarbons Are Safe and Environmentally Preferable," Int'l Symposium on Non-CO2 Greenhouse Gases, Jun. 30-Jul. 3, 2009 (NE).

* cited by examiner

Figure 1 – Bubble Point and Dew Point Pressures – transHFO-1234ze and $CO_2$

Figure 2– Bubble Point and Dew Point Pressures – transHFO-1234ze and $CO_2$

Figure 5- Bubble Point and Dew Point Pressures – HFO-1234yf and $CO_2$

Figure 6– Bubble Point and Dew Point Pressures – HFO-1234yf and $CO_2$

COMPOSITIONS CONTAINING TETRAFLUOROPROPENE AND CARBON DIOXIDE

CROSS REFERENCE TO RELATED APPLICATIONS

The present application claims priority to and is a Divisional of U.S. application Ser. No. 12/558,099 filed Sep. 11, 2009 (now U.S. Pat. No. 8,053,404). The present application claims priority to and is a Divisional of U.S. application Ser. No. 11/118,833 filed Apr. 29, 2005 (now U.S. Pat. No. 7,629,306). The present application also claims priority to and is a Continuation-in-Part of U.S. application Ser. No. 10/837,521 filed Apr. 29, 2004 (now U.S. Pat. No. 7,655,610).

The present application is also related to and incorporates by reference each of the following United States patent applications: U.S. application Ser. Nos. 10/837,525, filed Apr. 29, 2004 (now U.S. Pat. No. 7,279,451); 10/837,526, filed Apr. 29, 2004 (now U.S. Pat. No. 7,524,805); 10/694,273, filed Oct. 27, 2003 (now U.S. Pat. No. 7,534,366); 10/695,212, filed Oct. 27, 2003 (now abandoned); and 10/694,272, filed Oct. 27, 2003 (now U.S. Pat. No. 7,230,146).

The present application is related to and incorporates by reference each of the following U.S. Provisional Applications: 60/567,426; 60/567,429; 60/567,427; 60/567,425 and 60/567,428, all of which were filed on Apr. 29, 2004.

FIELD OF THE INVENTION

This present invention relates to compositions comprising $C_3$ fluoroolefins, particularly tetrafluoropropenes and carbon dioxide ($CO_2$).

BACKGROUND OF THE INVENTION

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, including the relatively high global warming potentials associated therewith, it is desirable to use fluids having low or even zero ozone depletion potential, such as hydrofluorocarbons ("HFCs"). Thus, the use of fluids that do not contain chlorofluorocarbons ("CFCs") or hydrochlorofluorocarbons ("HCFCs") is desirable. Furthermore, some HFC fluids may have relatively high global warming potentials associated therewith, and it is desirable to use hydrofluorocarbon or other fluorinated fluids having global warming potentials as low as possible while maintaining the desired performance in use properties. However, the identification of new, environmentally-safe, mixtures is frequently complicated by the need and/or desire to achieve a composition with such a diverse set of properties.

With respect to heat transfer fluids, it is desirable in many different situations to selectively transfer heat between a fluid and a body to be cooled or warmed. As used herein, the term "body" refers not only to solid bodies but also other fluid materials, which take the shape of the container in which they exist.

One well known system for achieving such transfer of heat achieves cooling of a body by first pressurizing a vapor phase heat transfer fluid and then expanding it through a Joule-Thomson expansion element, such as a valve, orifice, or other type of flow constriction. Any such device will be referred to hereinafter simply as a Joule-Thompson expansion element, and systems using such an element are sometimes referred to herein as Joule-Thompson systems. In most Joule-Thomson systems, single component, non-ideal gasses are pressurized and then expanded through a throttling component or expansion element, to produce substantially isenthalpic cooling. The characteristics of the gas used, such as boiling point, inversion temperature, critical temperature, and critical pressure effect the starting pressure needed to reach a desired cooling temperature. While such characteristics are all generally well known and/or relatively easy to predict with an acceptable degree of certainty for single component fluids, this is not necessarily the case for multi-component fluids Because of the large number of properties or characteristics which are relevant to the effectiveness and desirability of a heat transfer fluid in particular but to many other fluids in general, it is frequently difficult to predict in advance how any particular multi-component fluid will perform as a heat transfer fluid. For example, U.S. Pat. No. 5,774,052—Bivens discloses a combination of difluoroethane (HFC-32), pentafluoroethane (HFC-125) and a small amount (i.e., up to 5% by weight) of carbon dioxide (CO2) in the form of an azeotropic fluid that is said to have advantages as a refrigerant in certain applications. More particularly, the multi-component fluid of Bivens is said to be non-flammable and, due to its azeotropic nature, to undergo relatively little fractionation upon vaporization. However, applicants appreciate that, the fluids of Bivens are comprised of relatively highly-fluorinated compounds, which are potentially environmentally damaging from a global warming perspective. In addition, obtaining fluids with azeotropic properties can sometimes add significantly to the cost of such fluids when used as refrigerants.

U.S. Pat. No. 5,763,063—Richard et al. discloses a non-azeotropic combination of various hydrocarbons, including HFC-32, and carbon dioxide which form a fluid said to be acceptable as replacements for chlorotrans-1,3,3,3-tetrafluoropropene (HCFC-22). In particular, the Richard et al. patent teaches that the vapor pressure of this fluid is substantially equal to HCFC-22, which is only about 83 psia. Therefore, while the fluid of Richard et al. is expected to perform well in certain refrigeration applications, it may be considered inadequate in the same types of applications mentioned above with respect to the Bivens fluid.

SUMMARY OF THE INVENTION

Applicants have discovered compositions which possess a highly desirable and unexpectedly superior combination of properties, particularly in connection with heat transfer applications, systems and methods, but which also have advantage with respect to other uses, such as blowing agents, propellants and sterilizing agents for example. With respect to heat transfer applications, the present compositions may be used as refrigerants in automotive air conditioning and heat pump systems, and in stationary air conditioning, heat pump and refrigeration systems, among others.

In preferred embodiments, the fluids of the present invention possess properties that have heretofore been associated with CFCs, including chemical stability, low toxicity, non-flammability, and efficiency in-use, while at the same time substantially reducing or eliminating the deleterious ozone depletion potential of such compositions. In addition, the preferred embodiments of the present invention provide compositions which also substantially reduce or eliminate the negative global warming effects associated with many compositions previously used as heat transfer fluids, blowing agents, propellants, sterilants, and others. This difficult to achieve combination of characteristics is important, for example, in low temperature air conditioning, refrigeration and heat pump applications, among others.

The present invention thus provides preferred composition comprising from about 1 to about 40 percent, on a weight basis, of carbon dioxide ($CO_2$) and from about 60 to about 99 percent, on a weight basis, of a compound having the Formula I $XCF_zR_{3-z}$ (I), where X is a $C_2$ or a $C_3$ unsaturated, substituted or unsubstituted, alkyl radical, each R is independently Cl, F, Br, I or H, and z is 1 to 3. In preferred embodiments, the Formula (I) compound is tetrafluoropropene, more preferably tetrafluoropropene selected from the group consisting of 1,1,3-tetrafluoropropene (either cis or trans but preferably transHFO-1234ze.), 1,1,1,2-tetrafluoropropene (HFO-1234yf, and combinations of these. Compounds of Formula I are disclosed in copending U.S. patent application Ser. No. 10/694,273, which is incorporated herein by reference. Preferred compositions of the invention, particularly where the composition is a heat transfer fluid, comprise from about 5 to about 30 percent by weight of carbon dioxide ($CO_2$) and from about 70 to about 95 percent by weight of Formula I compound, preferably HFO-1234ze and/or HFO-1234yf. The preferred fluids of the present invention have a vapor pressure of at least about 30 psia at 35° F. The fluids are also preferably not azeotropic.

DETAILED DESCRIPTION OF PREFERRED EMBODIMENTS

Figure 1:
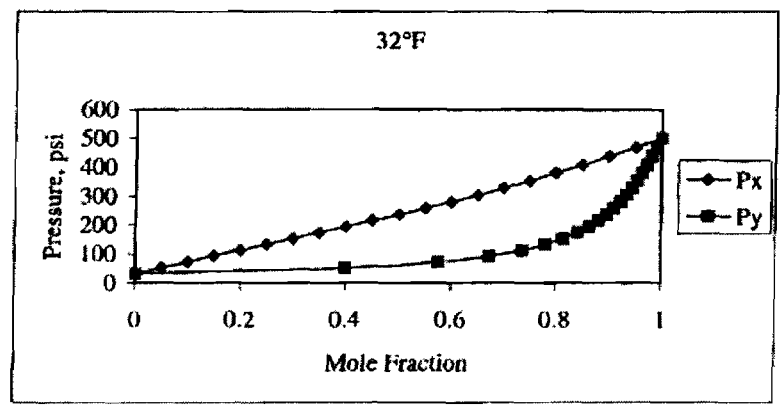
FIG. 1 is a graphical representation of the dew and bubble points of certain embodiments of the present compositions consisting of transHFO-1234ze and $CO_2$ at about 32° F.

The present inventors have developed compositions that help to satisfy the continuing need for alternatives to CFCs and HCFCs. According to certain embodiments, the present invention provides compositions comprising $CO_2$ and one or more tetrafluoropropene compounds, including preferably trans-1,1,1,3-tetrafluoropropene ("transHFO-1234ze"), cis-1,1,1,3-tetrafluoropropene ("cisHFO-1234ze"), HFO-1234yf and combinations of these.

The term "HFO-1234" is used herein to refer to all tetrafluoropropenes. Among the tetrafluoropropenes are included HFO-1234yf and both cis- and trans-1,1,1,3-tetrafluoropropene (HFO-1234ze). The term HFO-1234ze is used herein generically to refer to 1,1,1,3-tetrafluoropropene, independent of whether it is the cis- or trans-form. The terms "cisHFO-1234ze" and "transHFO-1234ze" are used herein to describe the cis- and trans-forms of 1,1,1,3-tetrafluoropropene respectively. The term "HFO-1234ze" therefore includes within its scope cisHFO-1234ze, transHFO-1234ze, and all combinations and mixtures of these.

Although the properties of cisHFO-1234ze and transHFO-1234ze differ in at least some respects, it is contemplated that each of these compounds is adaptable for use, either alone or together with other compounds including its stereoisomer, in connection with each of the compositions, applications, methods and systems described herein. For example, while transHFO-1234ze may be preferred for use in certain refrigeration systems because of its relatively low boiling point (−19° C.), it is nevertheless contemplated that cisHFO-1234ze, with a boiling point of +9° C., also has utility in certain refrigeration systems of the present invention. Accordingly, it is to be understood that the terms "HFO-1234ze" and 1,1,1,3-tetrafluoropropene refer to both stereo isomers, and the use of this term is intended to indicate that each of the cis- and trans-forms applies and/or is useful for the stated purpose unless otherwise indicated.

HFO-1234 compounds are known materials and are listed in Chemical Abstracts databases. The production of fluoropropenes such as $CF_3CH=CH_2$ by catalytic vapor phase fluorination of various saturated and unsaturated halogen-containing C3 compounds is described in U.S. Pat. Nos. 2,889,379; 4,798,818 and 4,465,786, each of which is incorporated herein by reference. EP 974,571, also incorporated herein by reference, discloses the preparation of 1,1,1,3-tetrafluoropropene by contacting 1,1,1,3,3-pentafluoropropane (HFC-245fa) in the vapor phase with a chromium-based catalyst at elevated temperature, or in the liquid phase with an alcoholic solution of KOH, NaOH, Ca(OH)2 or Mg(OH)2. In addition, methods for producing compounds in accordance with the present invention are described generally in connection with pending United States patent application entitled "Process for Producing Fluoropropenes" bearing attorney docket number (H0003789 (26267)), which is also incorporated herein by reference.

In addition, applicants have recognized that the present compositions, and, preferably compositions in which the combination of HFO-1234 and $CO_2$ together comprise at least about 50% by weight of the composition, exhibit properties that make that make them advantageous for use as, or in, numerous applications, including as heat transfer compositions (including as refrigerants in automotive air conditioning and heat pump systems, and in stationary air conditioning, heat pump and refrigeration systems), blowing agents, propellants, sterilizing agents and others. Accordingly, in yet other embodiments, the present invention provides compositions and methods associated with these and other uses.

The present compositions, particularly those comprising HFO-1234yf, HFO-1234ze and combinations of these, are believed to possess properties that are advantageous for a number of important reasons. For example, applicants believe, based at least in part on mathematical modeling, that the fluoroolefins of the present invention will not have a substantial negative affect on atmospheric chemistry, being negligible contributors to ozone depletion in comparison to some other halogenated species. The preferred compositions of the present invention thus have the advantage of not contributing substantially to ozone depletion. The preferred compositions also do not contribute substantially to global warming compared to many of the hydrofluoroalkanes presently in use.

In certain preferred forms, compositions of the present invention have a Global Warming Potential (GWP) of not greater than about 1000, more preferably not greater than about 500, and even more preferably not greater than about 150. In certain embodiments, the GWP of the present compositions is not greater than about 100 and even more preferably not greater than about 75. As used herein, "GWP" is measured relative to that of carbon dioxide and over a 100-year time horizon, as defined in "The Scientific Assessment of Ozone Depletion, 2002, a report of the World Meteorological Association's Global Ozone Research and Monitoring Project," which is incorporated herein by reference.

In certain preferred forms, the present compositions also preferably have an Ozone Depletion Potential (ODP) of not greater than 0.05, more preferably not greater than 0.02 and even more preferably about zero. As used herein, "ODP" is as defined in "The Scientific Assessment of Ozone Depletion, 2002, A report of the World Meteorological Association's Global Ozone Research and Monitoring Project," which is incorporated herein by reference.

The amount of the Formula I compounds, particularly HFO-1234, contained in the present compositions can vary widely, depending the particular application, and compositions containing more than trace amounts and less than 100% of the compound are within broad the scope of the present invention. In preferred embodiments, the present compositions comprise HFO-1234, preferably HFO-1234yf and/or HFO-1234ze, in amounts from about 5% by weight to about 99% by weight, and even more preferably from about 5% to about 95%. Many additional compounds may be included in the present compositions, and the presence of all such compounds is within the broad scope of the invention. In certain preferred embodiments, the present compositions include, in addition to HFO-1234ze and/or HFO-1234yf, one or more of the following:

Trichlorofluoromethane (CFC-11)
Dichlorodifluoromethane (CFC-12)
Difluoromethane (HFC-32)
Pentafluoroethane (HFC-125)
1,1,2,2-tetrafluoroethane (HFC-134)
1,1,1,2-Tetrafluoroethane (HFC-134a)
Difluoroethane (HFC-152a)
1,1,1,2,3,3,3-Heptafluoropropane (HFC-227ea)
1,1,1,3,3,3-hexafluoropropane (HFC-236fa)
1,1,1,3,3-pentafluoropropane (HFC-245fa)
1,1,1,3,3-pentafluorobutane (HFC-365mfc)
water The relative amount of any of the above noted components, as well as any additional components which may be included in present compositions, can vary widely within the general broad scope of the present invention according to the particular application for the composition, and all such relative amounts are considered to be within the scope hereof.

Accordingly, applicants have recognized that certain compositions of the present invention can be used to great advantage in a number of applications. For example, included in the present invention are methods and compositions relating to heat transfer applications, foam and blowing agent applications, propellant applications, sprayable compositon applications, sterilaztion applications, and others. The present compositions are generally useful as replacements for CFCs, such as dichlorodifluormethane (CFC-12), HCFCs, such as chlorodifluoromethane (HCFC-22), HFCs, such as tetrafluoroethane (HFC-134a), and combinations of HFCs and CFCs, such as the combination of CFC-12 and 1,1-difluorethane (HFC-152a) (the combination CFC-12:HFC-152a in a 73.8:26.2 mass ratio being known as R-500) in refrigerant, aerosol, and other applications.

According to certain preferred embodiments, the compositions of the present invention comprise, and preferably consist essentially of, effective amounts of HFO-1234 and $CO_2$. The term "effective amounts" as used herein refers to the amount of each component which upon combination with the other component(s), results in the formation of a composition having the desired properties, characteristics and functionality. It is believed that the amount of each compound required to provide an effective amount can be readily determined by those skilled in the art in view of the teachings contained herein without undue experimentation.

Applicants believe that, in general, the compositions of the present invention are generally effective and exhibit utility as refrigerant compositions, blowing agent compositions, compatibilizers, aerosols, propellants, fragrances, flavor formulations, and solvent compositions, among others.

The Heat Transfer Fluids

The heat transfer compositions of the present invention are generally adaptable for use in heat transfer applications, that is, as a heating and/or cooling medium. Although it is contemplated that the compositions of the present invention may include, in widely ranging amounts, compounds and/or components in addition to the fluoroolefins and $CO_2$, it is generally preferred that heat transfer compositions of the present invention, including refrigerant compositions, consist essentially of, and in some embodiments consist of fluorolefin of formula I and $CO_2$.

The preferred heat transfer fluids comprise, and in certain preferred embodiments consist essentially of, HFO-1234 and $CO_2$. In certain preferred embodiments the compositions consist essentially of HFO-1234ze and $CO_2$, and in other preferred embodiments the compositions consist essentially of HFO-1234yf and $CO_2$. The relative amount of the hydrofluoroolefin used in accordance with the present invention is preferably selected to produce a heat transfer fluid which has the required heat transfer capacity, particularly refrigeration capacity, and preferably is at the same time non-flammable. As used herein, the term non-flammable refers to a fluid which is non-flammable in all proportions in air as measured by ASTM E-681.

In certain embodiments, such as those in which both performance and non-flammability are especially important, it is preferred that the heat transfer fluid comprise, and preferably consist of, from about 1 to about 40 wt % $CO_2$ and from about 60 to about 99 wt. % Formula I compound, preferably HFO-1234ze and/or HFO-1234yf, with fluids comprising from about 5 to about 35 wt. % $CO_2$ and from about 65 to about 95 wt % of HFO-1234ze and/or HFO-1234yf, being even more preferred. In highly preferred embodiments, the heat transfer fluid consists essentially of, and in certain embodiments consists of, HFO-1234ze and $CO_2$. In certain other highly preferred embodiments, the heat transfer fluid consists essentially of, and in certain embodiments consists of, HFO-1234yf and $CO_2$.

The heat transfer fluids of the present invention are adaptable for use in a wide variety of heat transfer applications, and all such applications are within the scope of the present invention. The present fluids find particular advantage and unexpectedly beneficial properties in connection with applications that require and/or can benefit from the use of highly efficient, non-flammable refrigerants that exhibit low or negligible global warming effects, and low or no ozone depletion potential. The present fluids also provide advantage to low temperature refrigeration applications, such as those in which the refrigerant is provided at a temperature of about −20° C. or less and which have relatively high cooling power. The preferred heat transfer fluids are highly efficient in that they exhibit a coefficient of performance (COP) that is high relative to the COP of the individual components of the fluid and/or relative to many refrigerants which have previously been used. The term COP is well known to those skilled in the art and is based on the theoretical performance of a refrigerant at specific operating conditions as estimated from the thermodynamic properties of the refrigerant using standard refrigeration cycle analysis techniques. See, for example, "Fluorocarbons Refrigerants Handbook", Ch. 3, Prentice-Hall, (1988), by R. C. Downing, which is incorporated herein by reference. The coefficient of performance, COP, is a universally accepted measure, especially useful in representing the relative thermodynamic efficiency of a refrigerant in a specific heating or cooling cycle involving evaporation or condensation of refrigerant. COP is related to or a measure of the ratio of useful refrigeration to the energy applied by the compressor in compressing the vapor and therefore expresses the capability of a given compressor to pump quantities of heat for a given volumetric flow rate of a heat transfer fluid, such as a refrigerant. In other words, given a specific compressor, a refrigerant with a higher COP will deliver more cooling or heating power.

Similarly the cooling capacity of a refrigerant is also an important parameter and can be estimated from the thermodynamic properties of the refrigerant. If the refrigerant is to be used in a system designed for another refrigerant, the capacity of the two refrigerants should be similar, in order to obtain a similar performance and to minimize the system adjustments and/or modifications needed as part of the replacement process. Among the common refrigerants being used in refrigeration and air conditioning/heat pumps, and which may be replaced by the compositions of the present invention, are R-507A, R-404A, R-22, R-407C and R-410A. The applicants have found that various composition of this invention can be used in the applications where these refrigerants are used with slight adjustments in composition.

In certain preferred embodiments, the compositions of the present invention are used in refrigeration systems originally designed for use with an HFC refrigerant, such as, for example, HFC-134a, or an HCFC refrigerant, such as, for example, HCFC-22. The preferred compositions of the present invention tend to exhibit many of the desirable characteristics of HFC-134a and other HFC refrigerants, including a GWP that is as low, or lower than that of conventional HFC refrigerants, and a capacity that is substantially similar to or substantially matches, and preferably is as high as or higher than such refrigerants. In particular, applicants have recognized that the preferred compositions of the present invention tend to exhibit relatively low global warming potentials ("GWPs"), preferably less than about 1000, more preferably less than about 500, and even more preferably less than about 150. Certain embodiments are particularly desirable as alternatives to or replacements for certain conventional HFCs, such as R-404A or combinations of HFC-32, HFC-125 and HFC-134a (the combination HFC-32:HFC-125: HFC134a in approximate 23:25:52 weight ratio is referred to as R-407C), for use as refrigerants in many applications. Heat transfer compositions of the present invention are particularly preferred as alternates to or replacements for HFC-32, HFC-125, HFC-134a, HFC-143a, HFC-152a, HFC-22, R-12 and R-500.

In certain other preferred embodiments, the present compositions are used in heat transfer systems in general, and in refrigeration systems in particular, originally designed for use with a CFC-refrigerant. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers (including chillers using centrifugal compressors), transport refrigeration systems, commercial refrigeration systems and the like.

In certain preferred embodiments, the present compositions, particularly compositions in the form of heat transfer fluids generally and refrigerants in particular, further comprise a lubricant. Any of a variety of conventional and unconventional lubricants may be used in the compositions of the present invention. An important requirement for the lubricant is that, when in use in a refrigerant system, there must be sufficient lubricant returning to the compressor of the system such that the compressor is lubricated. Thus, suitability of a lubricant for any given system is determined partly by the refrigerant/lubricant characteristics and partly by the characteristics of the system in which it is intended to be used. Examples of suitable lubricants, which are generally those commonly used in refrigeration machinery using or designed to use hydrofluorocarbon (HFC) refrigerants, chlorofluorocarbon refrigerants and hydrochlorofluorocarbons refrigerants, include mineral oil, silicone oil, polyalkyl benzenes (sometimes referred to as PABs), polyol esters (sometimes referred to as POEs), polyalkylene glycols (sometimes referred to as PAGs), polyalkylene glycol esters (sometimes referred to as PAG esters), polyvinyl ethers (sometimes referred to as PVEs), poly(alpha-olefin) (sometimes referred to as PAOs), and halocarbon oils, particularly poly(chlorotrifluorethylene) and the like. Mineral oil, which comprises paraffin oil or naphthenic oil, is commercially available. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available polyalkyl benzene lubricants include Zerol 150 (registered trademark). Commercially available esters include neopentyl glycol dipelargonate which is available as Emery 2917 (registered trademark) and Hatcol 2370 (registered trademark). Commercially available PAGs include Motorcraft PAG Refrigerant Compressor Oil, available from Ford, with similar products being available from Dow. Commercially available PAOs include CP-4600 from CPI Engineering. Commercially available PVEs are available from Idemitsu Kosan. Commercially available PAG esters are available from Chrysler. Other useful esters include phosphate esters, dibasic acid esters, and fluoroesters.

For refrigeration systems using or designed to use HFCs, it is generally preferred to use as lubricants PAGs, PAG esters, PVEs, and POEs, particularly for systems comprising compression refrigeration, air-conditioning (especially for automotive air conditioning) and heat pumps. For refrigeration systems using or designed to use CFCs or HCFCs, it is generally preferred to use as lubricants mineral oil or PAB. In certain preferred embodiments, the lubricants of this invention are organic compounds which are comprised of carbon, hydrogen and oxygen with a ratio of oxygen to carbon which provides, in combination with the amounts used, effective solubility and/or miscibility with the refrigerant to ensure sufficient return of the lubricant to the compressor. This solubility or miscibility preferably exists at least one temperature from about −30° C. and 70° C.

PAGs and PAG esters are highly preferred in certain embodiments because they are currently in use in particular applications such as original equipment mobile air-conditioning systems. Polyol esters are highly preferred in other certain embodiments because they are currently in use in particular non-mobile applications such as residential, commercial, and industrial air conditioning and refrigeration. Of course, different mixtures of different types of lubricants may be used.

Many existing refrigeration systems are currently adapted for use in connection with existing refrigerants, and the compositions of the present invention are believed to be adaptable for use in many of such systems, either with or without system modification. In many applications the compositions of the present invention may provide an advantage as a replacement in smaller systems currently based on certain refrigerants, for example those requiring a small refrigerating capacity and thereby dictating a need for relatively small compressor displacements. Furthermore, in embodiments where it is desired to use a lower capacity refrigerant composition of the present invention, for reasons of efficiency for example, to replace a refrigerant of higher capacity, such embodiments of the present compositions provide a potential advantage. Thus, it is preferred in certain embodiments to use compositions of the present invention, particularly compositions comprising a substantial proportion of, and in some embodiments consisting essentially of the present compositions, as a replacement for existing refrigerants, such as: HFC-134a; CFC-12; HCFC-22; HFC-152a; combinations of pentfluoroethane (HFC-125), trifluorethane (HFC-143a) and tetrafluoroethane (HFC-134a) (the combination HFC-125:HFC-143a:HFC134a in approximate 44:52:4 weight ratio is referred to as R-404A); combinations of HFC-32, HFC-125 and HFC-134a (the combination HFC-32:HFC-125:HFC134a in approximate 23:25:52 weight ratio is referred to as R-407C); combinations of methylene fluoride (HFC-32) and pentfluoroethane (HFC-125) (the combination HFC-32:HFC-125 in approximate 50:50 weight ratio is referred to as R-410A and also as AZ-20); the combination of CFC-12 and 1,1-difluorethane (HFC-152a) (the combination CFC-12:HFC-152a in a 73.8:26.2 weight ratio is referred to R-500); and combinations of HFC-125 and HFC-143a (the combination HFC-125:HFC143a in approximate 50:50 weight ratio is referred to as R-507A). In certain embodiments it may also be beneficial to use the present compositions in connection with the replacement of refrigerants formed from the combination HFC-32:HFC-125:HFC134a in approximate 20:40:40 weight ratio, which is referred to as R-407A, or in approximate 15:15:70 weight ratio, which is referred to as R-407D. The present compositions are also believed to be suitable as replacements for the above noted compositions in other applications, such as aerosols, blowing agents and the like.

In certain applications, the refrigerants of the present invention potentially permit the beneficial use of larger displacement compressors, thereby resulting in better energy efficiency than other refrigerants, such as HFC-134a. Therefore the refrigerant compositions of the present invention provide the possibility of achieving a competitive advantage on an energy basis for refrigerant replacement applications.

It is contemplated that the compositions of the present also have advantage (either in original systems or when used as a replacement for refrigerants such as CFC-12, HCFC-22, HFC-134a, HFC-152a, R-500 and R-507A), in chillers typically used in connection with commercial air conditioning and refrigeration systems. In certain of such embodiments it is preferred to including in the present compositions from about 0.5 to about 30% of a supplemental flammability suppressant, and in certain cases more preferably 0.5% to about 15% by weight and even more preferably from about 0.5 to about 10% on a weight basis. In this regard it is noted that the $CO_2$ and HFO-1234 components of the present compositions may in certain embodiments act as flammability suppressants with respect to other components in the composition. For example, $CO_2$ is believed to function to suppress the flammability of HFO-1234ze. In cases where other components more flammable are included in the composition, HFO1234-ze and $CO_2$ may each function to suppress the flammability of such other component. Thus, components other than HFO1234-ze and $CO_2$ which have flammability suppressant functionality in the composition will sometimes be referred to herein as a supplemental flammability suppressant.

In certain embodiments, co-refrigerants, including for example HFCs, HCFCs and CFCs may be included in the heat transfer compositions of the present invention, including one or more of the following, including any and all isomers thereof:

Trichlorofluoromethane (CFC-11)
Dichlorodifluoromethane (CFC-12)
Difluoromethane (HFC-32)
Pentafluoroethane (HFC-125)
1,1,2,2-tetrafluoroethane (HFC-134)
1,1,1,2-Tetrafluoroethane (HFC-134a)
Difluoroethane (HFC-152a)
1,1,1,2,3,3,3-Heptafluoropropane (HFC-227ea)
1,1,1,3,3,3-hexafluoropropane (HFC-236fa)
1,1,1,3,3-pentafluoropropane (HFC-245fa)
1,1,1,3,3-pentafluorobutane (HFC-365mfc)
water The relative amount of any of the above noted components, as well as any additional components which may be included in present compositions, may be incorporated in amounts depending on the particular application for the composition, and all such relative amounts are considered to be within the scope hereof.

The present methods, systems and compositions are thus adaptable for use in connection with automotive air conditioning systems and devices, commercial refrigeration systems and devices, chillers (including systems which utilize centrifugal compressors), residential refrigerator and freezers, general air conditioning systems, heat pumps, and the like.

As mentioned before, any additional components (such as stabilizers, passivators, and the like) not specifically mentioned herein but known to those skilled in the art may be added to the composition to tailor the properties to the need.

Heat Transfer Methods and Systems

The method aspects of the present invention comprise transferring heat to or from a body using a heat transfer fluid in accordance with the present invention. Sensible heat transfer and/or heat transfer by means of evaporation or condensation are within the scope of the present invention. Those skilled in the art will appreciate that many known methods may adapted for use with the present invention in view of the teachings contained herein, and all such methods are within the broad scope hereof. For example, vapor compressions cycles are methods commonly used for refrigeration and/or air conditioning. In its simplest form, the vapor compression cycle involves providing the present heat transfer fluid in liquid form and changing the refrigerant from the liquid to the vapor phase through heat absorption, generally at relatively low pressure, and then from the vapor to the liquid phase through heat removal, generally at an elevated pressure. In such embodiments, the refrigerant of the present invention is vaporized in one or more vessels, such as an evaporator, which is in contact, directly or indirectly, with the body to be cooled. The pressure in the evaporator is such that vaporization of the heat transfer fluid takes place at a temperature below the temperature of the body to be cooled. Thus, heat flows from the body to the refrigerant and causes the refrigerant to vaporize. The heat transfer fluid in vapor form is then removed, preferably by means of a compressor or the like which at once maintains a relatively low pressure in the evaporator and compresses the vapor to a relatively high pressure. The temperature of the vapor is also generally increased as a result of the addition of mechanical energy by the compressor. The high pressure vapor then passes to one or more vessels, preferably a condenser, whereupon heat exchange with a lower temperature medium removes the sensible and latent heats, producing subsequent condensation. The liquid refrigerant, optionally with further cooling, then passes to the expansion valve and is ready to cycle again.

In one embodiment, the present invention provides a method for transferring heat from a body to be cooled to the present heat transfer fluid comprising compressing the fluid in a centrifugal chiller, which may be single or multi-stage. As used herein, the term "centrifugal chiller" refers to one or more pieces of equipment which cause an increase in the pressure of the present heat transfer fluid.

Certain preferred methods for heating a fluid or body comprise condensing a refrigerant composition comprising an azeotrope-like composition of the present invention in the vicinity of the fluid or body to be heated and thereafter evaporating said refrigerant composition. In light of the disclosure herein, those of skill in the art will be readily able to heat and cool articles according to the present inventions without undue experimentation.

Applicants have found that in the systems of the present invention many of the important refrigeration system performance parameters are relatively close to the parameters for referigerants such as R-134a, HCFC-22, R-407C, R-410A and combinations of these. Since many existing refrigeration systems have been designed for these referigerants, particularly R-134a, or for other refrigerants with properties similar to these, those skilled in the art will appreciate the substantial advantage of a low GWP and/or a low ozone depleting refrigerant that can be used as replacement for R-134a, HCFC-22, R-407C, R-410A or like refrigerants with relatively minimal modifications to the system. It is contemplated that in certain embodiments the present invention provides retrofitting methods which comprise replacing the refrigerant in an existing system with a composition of the present invention, without substantial modification of the system. In certain preferred embodiments the replacement step is a drop-in replacement in the sense that no substantial redesign of the system is required and no major item of equipment needs to be replaced in order to accommodate the refrigerant of the present invention. In certain preferred embodiments, the methods comprise a drop-in replacement in which the capacity of the system is at least about 70%, preferably at least about 85%, and even more preferably at least about 90% of the system capacity prior to replacement. In certain preferred embodiments, the methods comprise a drop-in replacement in which the suction pressure and/or the discharge pressure of the system, and even more preferably both, is/are at least about 70%, more preferably at least about 90% and even more preferably at least about 95% of the system capacity prior to replacement. In certain preferred embodiments, the methods comprise a drop-in replacement in which the mass flow of the system is at least about 80%, and even more preferably at least 90% of the system capacity prior to replacement.

In certain preferred embodiments, the methods for cooling, including cooling of other fluid either directly or indirectly or a body directly or indirectly, comprise condensing the present refrigerant composition and thereafter evaporating said refrigerant composition in the vicinity of the fluid or body to be cooled. As used herein, the term "body" is intended to refer not only to inanimate objects but also to living tissue, including animal tissue in general and human tissue in particular. For example, certain aspects of the present invention involve application of the present composition to human tissue for one or more therapeutic purposes, such as a pain killing technique, as a preparatory anesthetic, or as part of a therapy involving reducing the temperature of the body being treated. In certain embodiments, the application to the body comprises providing the present compositions in liquid form under pressure, preferably in a pressurized container having a one-way discharge valve and/or nozzle, and releasing the liquid from the pressurized container by spraying or otherwise applying the composition to the body. As the liquid evaporates from the surface being sprayed, the surface cools.

The present invention also provides methods, systems and apparatus for cooling of objects or very small portions of objects to very low temperatures, sometimes referred to herein for the purposes of convenience, but not by way of limitation, as micro-freezing. The objects to be cooled in accordance with the present micro-freezing methods may include not only inanimate matter (eg., electronic components), but also animate matter (biological matter) In certain embodiments, the invention provides for selective cooling of a very small or even microscopic object to a very low temperature without substantially affecting the temperature of surrounding objects. Such methods, which are sometimes referred to herein as "selective micro-freezing," are advantageous in several fields, such as for example in electronics, where it may be desirable to apply cooling to a miniature component on a circuit board without substantially cooling adjacent components. Such methods may also provide advantage in the field of medicine, where it may be desirable cool miniature discrete portions of biological tissue to very low temperatures in the performance of medical techniques, including for anesthetic purposes, pain killing purposes, therapeutic purposes (eg., cryosurgery), preferably without substantially cooling adjacent tissues.

Cryosurgery methods of the present invention include, but are not limited to, medical (such as gynecology, dermatology, neurosurgery and urology), dental, and veterinary procedures. Unfortunately, currently known instruments and methods for selective micro-freezing have several limitations which make their use difficult or impossible in such fields. Specifically, known systems do not always have sufficient precision and flexibility to allow their widespread use in endoscopic and percutaneous cryosurgery.

One major advantage of the present methods and systems is the ability to provide relatively low temperature cooling with systems and methods that require relatively simple equipment and/or require only moderately elevated pressures. By way of contrast, typical prior art cryosurgical methods used liquid nitrogen or nitrous oxide as coolant fluids. Liquid nitrogen is usually either sprayed onto the tissue to be destroyed, or it is circulated to cool a probe which is applied to the tissue. Liquid nitrogen has an extremely low temperature of approximately 77° K, and a high cooling capacity, making it very desirable for this purpose. However, liquid nitrogen typically evaporates and escapes to the atmosphere during use, requiring the continual replacement of storage tanks. Further, since the liquid is so cold, the probes and other equipment used for its application require vacuum jackets or other types of insulation to protect the surrounding tissue. This makes the probes relatively complex, bulky, and rigid, and therefore unsuitable for endoscopic or intravascular use. The need for relatively bulky supply hoses and the progressive cooling of all the related components make the liquid nitrogen instruments less than comfortable for the physician, as well, and they can cause undesired tissue damage. Furthermore, nitrous oxide systems used in cryosurgery pressurize the gas to 700 to 800 psia in order to reach practical cooling temperatures of no lower than about 190° K to 210° K. In the preferred systems and methods of the present invention, particularly cooling apparatus use in the production of lasers, superconductors and electronics, and in cryosurgery, the system and methods operate effectively and with a high degree of efficiency using a heat transfer fluid of the present invention and a fluid let-down pressure less than about 420 psia.

Propellant and Aerosol Compositions

In another embodiment, the compositions of this invention may be used as propellants in sprayable compositions, either alone or in combination with known propellants. The propellant composition comprises, more preferably consists essentially of, and, even more preferably, consists of the compositions of the invention. The active ingredient to be sprayed together with inert ingredients, solvents, and other materials may also be present in the sprayable mixture. Preferably, the sprayable composition is an aerosol. Suitable active materials to be sprayed include, without limitation, cosmetic materials such as deodorants, perfumes, hair sprays, cleansers, and polishing agents as well as medicinal materials and/or biologically active materials, such as anti-asthma and any other medication or the like, including preferably any other medicament or agent intended to be inhaled.

The medicament or other therapeutic agent is preferably present in the composition in a therapeutic amount, with a substantial portion of the balance of the composition comprising a compound of Formula I of the present invention, preferably HFO-1234, and even more preferably HFO-1234yf and/or HFO-1234ze.

Aerosol products for industrial, consumer or medical use typically contain one or more propellants along with one or more active ingredients, inert ingredients or solvents. The propellant provides the force that expels the product in aerosolized form. While some aerosol products are propelled with compressed gases like carbon dioxide, nitrogen, nitrous oxide and even air, most commercial aerosols use liquefied gas propellants. The most commonly used liquefied gas propellants are hydrocarbons such as butane, isobutane, and propane. Dimethyl ether and HFC-152a (1,1-difluoroethane) are also used, either alone or in blends with the hydrocarbon propellants. Unfortunately, all of these liquefied gas propellants are highly flammable and their incorporation into aerosol formulations will often result in flammable aerosol products.

Applicants have come to appreciate the continuing need for nonflammable, liquefied gas propellants with which to formulate aerosol products. The present invention provides compositions of the present invention, particularly and preferably compositions comprising $CO_2$ and HFO-1234, and even more preferably HFO-1234yf and/or HFO-1234ze, for use in certain industrial aerosol products, including for example spray cleaners, lubricants, and the like, and in medicinal aerosols, including for example to deliver medications to the lungs or mucosal membranes. Examples of this includes metered dose inhalers (MDIs) for the treatment of asthma and other chronic obstructive pulmonary diseases and for delivery of medicaments to accessible mucous membranes or intranasally. The present invention thus includes methods for treating ailments, diseases and similar health related problems of an organism (such as a human or animal) comprising applying a composition of the present invention containing a medicament or other therapeutic component to the organism in need of treatment. In certain preferred embodiments, the step of applying the present composition comprises providing a MDI containing the composition of the present invention (for example, introducing the composition into the MDI) and then discharging the present composition from the MDI.

The compositions of the present invention, particularly compositions comprising or consisting essentially of $CO_2$ and HFO-1234 (preferably HFO-1234yf, HFO-1234ze and combinations thereof), are capable of providing nonflammable, liquefied gas propellant and aerosols that do not contribute substantially to global warming. The present compositions can be used to formulate a variety of industrial aerosols or other sprayable compositions such as contact cleaners, dusters, lubricant sprays, and the like, and consumer aerosols such as personal care products, household products and automotive products. The present compositions are particularly preferred for use as an important component of propellant compositions for in medicinal aerosols such as metered dose inhalers. The medicinal aerosol and/or propellant and/or sprayable compositions of the present invention in many applications include, in addition to $CO_2$ and a compound of formula (I) or (II) (preferably HFO-1234), a medicament such as a beta-agonist, a corticosteroid or other medicament, and, optionally, other ingredients, such as surfactants, solvents, other propellants, flavorants and other excipients. The compositions of the present invention, unlike many compositions previously used in these applications, have good environmental properties and are not considered to be potential contributors to global warming or ozone depletion. The present compositions therefore provide in certain preferred embodiments substantially nonflammable, liquefied gas propellants having very low Global Warming potentials and/or low ozone depletions, as described above.

Blowing Agents, Foams, Foamable Compositions and Foaming Methods

Yet another embodiment of the present invention relates to blowing agents comprising a composition of the present invention. In one embodiment, the blowing agent comprises, and preferably consists essentially of, compositions of the present invention. In general, the blowing agent may include the compositions of the present invention in widely ranging amounts. It is generally preferred, however, that the blowing agents comprise compound(s) of formula I and $CO_2$, with amount of these components together comprising at least about 5% by weight, and even more preferably at least about 15% by weight, of the blowing agent. In certain preferred embodiments, the compound(s) of formula I and $CO_2$ together comprises at least about 50% by weight of the blowing agent, and in certain embodiments the blowing agent consists essentially of compound(s) of formula I and $CO_2$.

In certain preferred embodiments, the blowing agent includes, in addition to compound(s) of formula I and $CO_2$, one or more of co-blowing agents, fillers, vapor pressure modifiers, flame suppressants, stabilizers and like adjuvants.

In other embodiments, the invention provides foamable compositions. The foamable compositions of the present invention generally include one or more components capable of forming foam having a generally cellular structure and a blowing agent in accordance with the present invention. In certain embodiments, the one or more components comprise a thermosetting composition capable of forming foam and/or foamable compositions. Examples of thermosetting compositions include polyurethane and polyisocyanurate foam compositions and also phenolic foam compositions. In such foam embodiments, one or more of the present compositions are included as a blowing agent in a foamable composition, which composition preferably includes one or more additional components capable of reacting and foaming, or as a part of a premix containing one or more parts of the foamable composition, which preferably includes one or more of the components capable of reacting and/or foaming under the proper conditions to form a foam or cellular structure, as is well known in the art.

Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention. For example, the $CO_2$ of this composition may be produced in-situ by the well known reaction of water, which added to the polyol, with the Isocyanate component of the polyurethane fomable composition In yet other embodiments, the invention provides foamable compositions comprising thermoplastic or polyolefin foams, such as polystyrene (PS), polyethylene (PE), polypropylene (PP) and polyethyleneterpthalate (PET) foams, preferably low density foams. That is, in certain preferred embodiments, the one or more components comprise thermoplastic materials, particularly thermoplastic polymers and/or resins. Other examples of thermoplastic foam components include.

The present invention also provides go, and foams formed there from, preferably low-density foams. In certain embodiments, the thermoplastic foamable composition is an extrudable composition.

It will be appreciated by those skilled in the art, especially in view of the disclosure contained herein, that the order and manner in which the blowing agent of the present invention is formed and/or added to the foamable composition does not generally affect the operability of the present invention. For example, in the case of extrudable foams, it is possible that the various components of the blowing agent, and even the components of the present composition, not be mixed in advance of introduction to the extrusion equipment, or even that the components are not added to the same location in the extrusion equipment. Thus, in certain embodiments it may be desired to introduce one or more components of the blowing agent at first location in the extruder, which is upstream of the place of addition of one or more other components of the blowing agent, with the expectation that the components will come together in the extruder and/or operate more effectively in this manner. Nevertheless, in certain embodiments, two or more components of the blowing agent are combined in advance and introduced together into the foamable composition, either directly or as part of premix which is then further added to other parts of the foamable composition.

The invention also relates to foam, and preferably closed cell foam, prepared from a polymer foam formulation containing a composition of the invention, preferably as part of blowing agent.

Other uses of the present compositions include use as solvents for example as supercritical or high pressure solvents, deposition agents, as a carrier or part of delivery system for flavor formulations and fragrance formulations extractants of fragrances, including from plant matter, cleaning agents, and the like. Those of skill in the art will be readily able to adapt the present compositions for use in such applications without undue experimentation.

EXAMPLES

The invention is further illustrated in the following examples, which are intended to be illustrative, but not limiting in any manner.

Example 1

Figure 2:
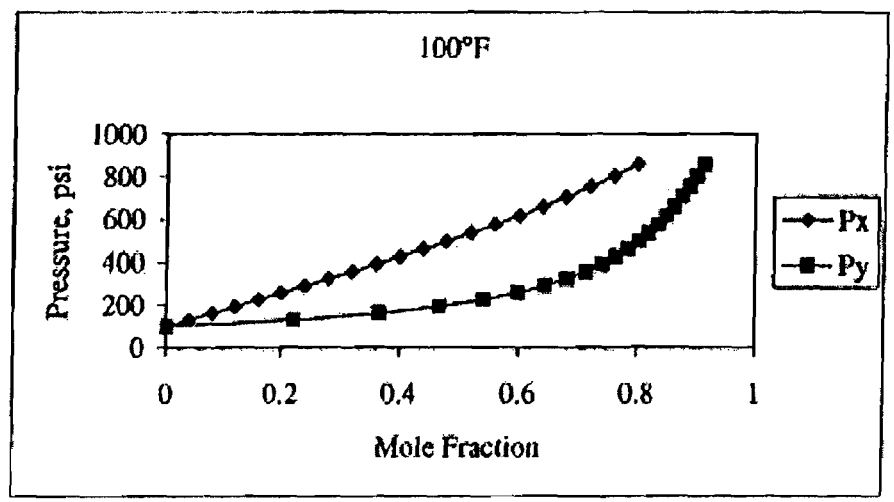
FIG. 2 is a graphical representation of the dew and bubble points of certain embodiments of the present compositions consisting of transHFO-1234ze and $CO_2$ at 100° F.

The bubble (Px) and dew (Py) pressures of various mixtures of trans-HFO-1234ze and $CO_2$ are given below at 32° F. (FIG. 1) and 100° F. (FIG. 2), as function of $CO_2$ mole fraction (composition). The fact that these pressures for any of the mixture compositions are intermediate between that of the pure components and are neither above nor below those of the pure components indicates that these compositions are non-azeotropic.

Comparative Example 1

This example illustrates the performance characteristics of a heat transfer fluid consisting of certain preferred compositions of the present invention compared to that of R-507A and R-404A, two refrigerants commonly used in low temperature and commercial refrigeration.

The test conditions are as follows:

| | |
|---|---|
| Mean Evaporator temp | −30° F. |
| Mean Condenser temp | 100° F. |
| Compressor displacement | 10 ft3/min |

Figure 3:
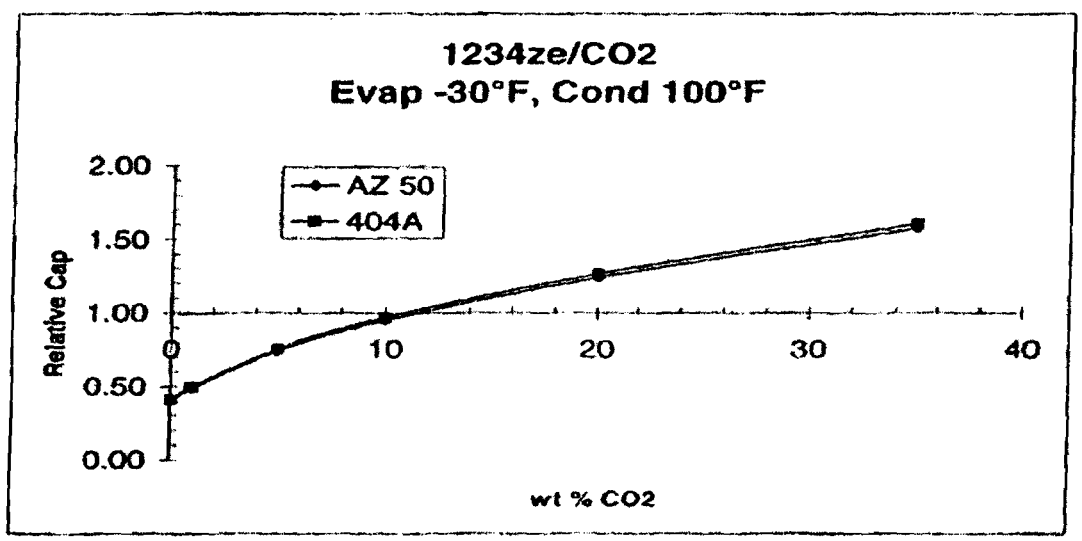
FIG. 3 is a graphical representation of test results showing the performance of certain embodiments of the present compositions consisting of transHFO-1234ze and $CO_2$ in comparison to previous compositions.

The results are illustrated in FIG. 3. Under the conditions of the present test, it is observed that a good capacity match is obtained by a preferred composition of the present invention in comparision to R-404A and R-507A (also known as AZ-50) at 8 to 14 wt % $CO_2$ (92 to 86 wt % transHFO-1234ze) composition.

Comparative Example 2

This example illustrates the performance characteristics of a heat transfer fluid consisting of preferred compositions of the present invention compared to that of R-410A (also known as AZ-20), R-407C and R-22, three refrigerants commonly used in air conditioning, heat pumps and chillers. The test conditions are as follows:

| | |
|---|---|
| Mean Evaporator temp | 35° F. |
| Mean Condenser temp | 110° F. |
| Compressor displacement | 10 ft3/min |

Figure 4:
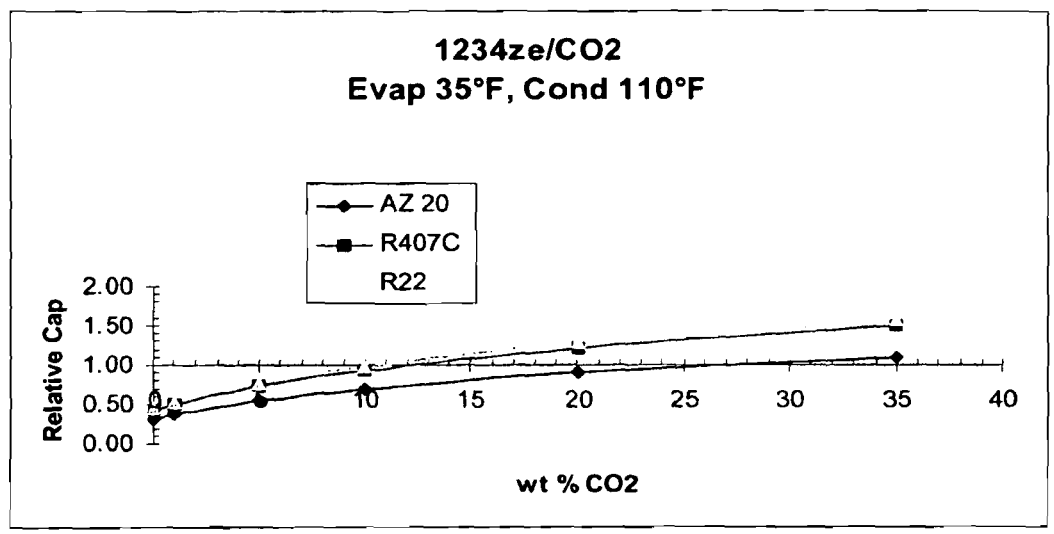
FIG. 4 is a graphical representation of test results showing the performance of certain embodiments of the present compositions consisting of transHFO-1234ze and $CO_2$ in comparison to previous compositions.
Figure 5:
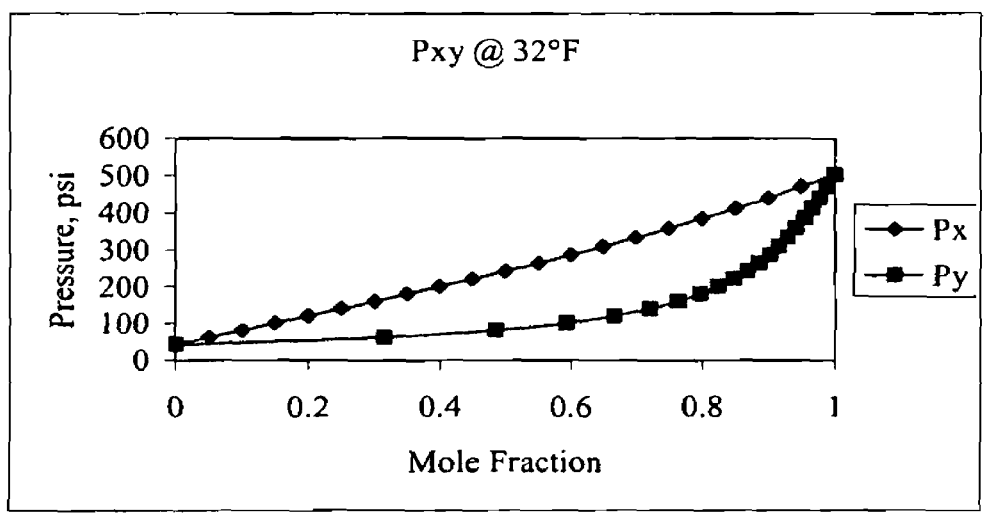
FIG. 5 is a graphical representation of the dew and bubble points of certain embodiments of the present compositions consisting of HFO-1234yf and $CO_2$ of the present invention at about 32° F.
Figure 6:
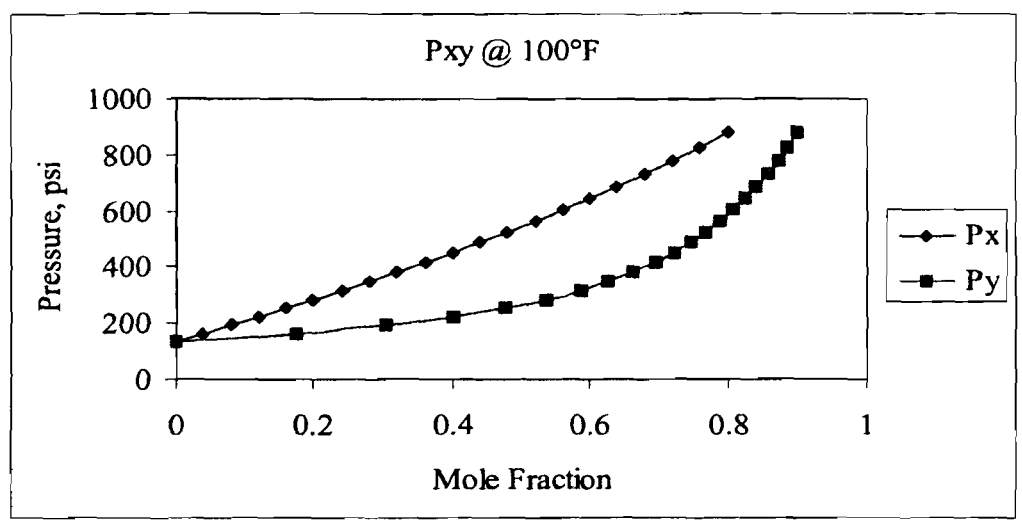
FIG. 6 is a graphical representation of the dew and bubble points of certain embodiments of the present compositions consisting of HFO-1234yf and $CO_2$ at about 100° F.
Figure 7:
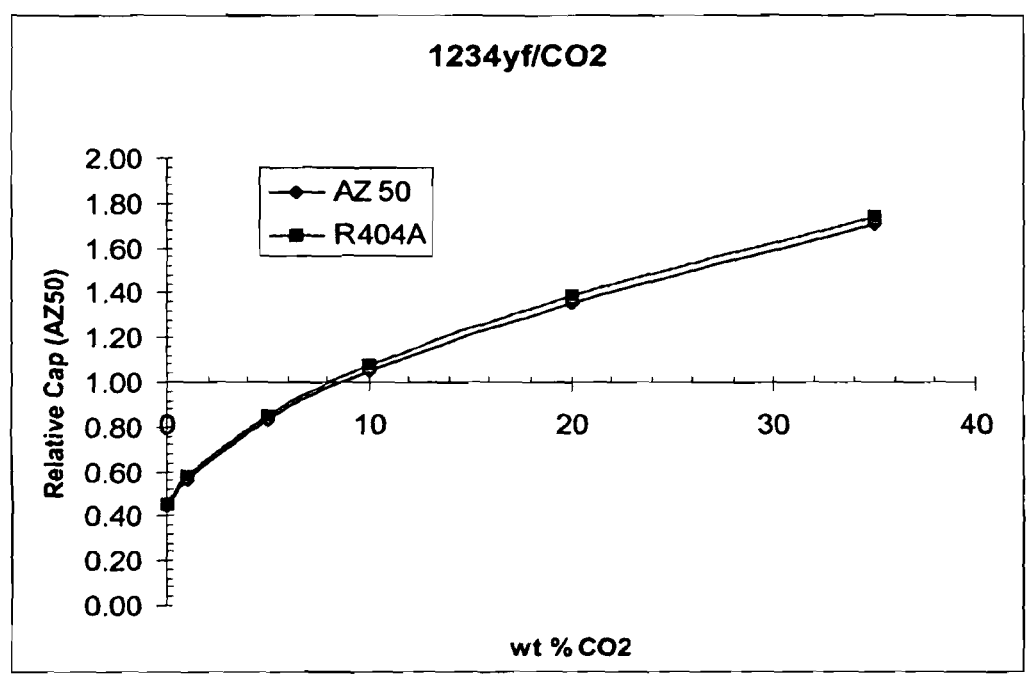
FIG. 7 is a graphical representation of test results showing the performance of certain embodiments of the present compositions consisting of HFO-1234yf and $CO_2$ in comparison to previous compositions.
Figure 8:
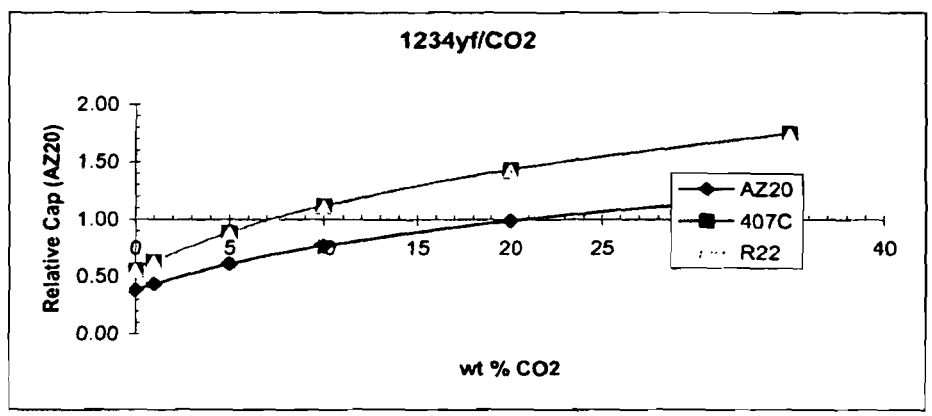
FIG. 8 is a graphical representation of test results showing the performance of certain embodiments of the present compositions consisting of HFO-1234yf and $CO_2$ in comparison to previous compositions.

The results are given in FIG. 4. Under the conditions of the present test, it is observed that a good capacity match is obtained with R-22 and R-407C in comparison to certain preferred compositions of the present invention, namely 8 to 16 wt % $CO_2$ (92 to 84 wt % HFO-1234ze), and that a good capacity match is obtained with R-410A (also known as AZ-20) in comparison to certain preferred compositions of the present invention, namely, 20 to 35 wt % $CO_2$ (80 to 65 wt % transHFO-1234ze).

It is apparent that many modifications and variations of this invention as hereinabove set forth may be made without departing from the spirit and scope thereof. The specific embodiments are given by way of example only and the invention is limited only by the terms of the appended claims.

Example 2

The bubble (Px) and dew (Py) pressures of various mixtures of trans-HFO-1234yf and $CO_2$ are given below at 32° F. (FIG. 1) and 100° F. (FIG. 2), as function of $CO_2$ mole fraction (composition). The fact that these pressures for any of the mixture compositions are intermediate between that of the pure components and are neither above nor below those of the pure components indicates that these compositions are non-azeotropic.

Comparative Example 1

This example illustrates the performance characteristics of a heat transfer fluid consisting of certain preferred compositions of the present invention compared to that of R-507A and R-404A, two refrigerants commonly used in low temperature and commercial refrigeration.

The test conditions are as follows:

| | |
|---|---|
| Mean Evaporator temp | −30° F. |
| Mean Condenser temp | 100° F. |
| Compressor displacement | 10 ft3/min |

The results are illustrated in FIG. 3. Under the conditions of the present test, it is observed that a good capacity match is obtained by a preferred composition of the present invention in comparision to R-404A and R-507A (also known as AZ-50) at 5 to 12 wt % $CO_2$ (95 to 88 wt % HFO-1234yf) composition.

Comparative Example 2

This example illustrates the performance characteristics of a heat transfer fluid consisting of preferred compositions of the present invention compared to that of R-410A (also known as AZ-20), R-407C and R-22, three refrigerants commonly used in air conditioning, heat pumps and chillers. The test conditions are as follows:

| | |
|---|---|
| Mean Evaporator temp | 35° F. |
| Mean Condenser temp | 110° F. |
| Compressor displacement | 10 ft3/min |

The results are given in FIG. 4. Under the conditions of the present test, it is observed that a good capacity match is obtained with R-22 and R-407C in comparison to certain preferred compositions of the present invention, namely 5 to 10 wt % $CO_2$ (95 to 90 wt % HFO-1234yf), and that a good capacity match is obtained with R-410A (also known as AZ-20) in comparison to certain preferred compositions of the present invention, namely, 15 to 25 wt % $CO_2$ (85 to 75 wt % HFO-1234yf).

It is apparent that many modifications and variations of this invention as hereinabove set forth may be made without departing from the spirit and scope thereof. The specific embodiments are given by way of example only and the invention is limited only by the terms of the appended claims.

What is claimed is:

1. A composition comprising from about 1 to about 40 percent by weight of carbon dioxide ($CO_2$) and from about 60 to about 99 percent by weight of one or more compounds of Formula I, $XCF_3(I)$, where X is a $C_2$ unsaturated, substituted, alkyl radical.

2. The composition of claim 1 wherein said one or more compounds of Formula I comprises 1,1,1,3-tetrafluoropropene (HFO-1234) and wherein said composition has a vapor pressure of at least about 30 psia at 35° F.

3. The composition of claim 1 wherein said one or more compounds of Formula I comprises 1,1,1,3-tetrafluoropropene (HFO-1234ze).

4. The composition of claim 3 wherein said one or more compounds of Formula I comprises trans-1,1,1,3-tetrafluoropropene (transHFO-1234ze) and wherein said composition has a vapor pressure of at least about 30 psia at 35° F.

5. A heat transfer composition comprising the composition of claim 1 and further comprising at least one lubricant.

6. The heat transfer composition of claim 5 wherein said lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly(alpha-olefins) (PAOs), and combinations of these.

7. A blowing agent comprising a composition of claim 1.

8. A blowing agent of claim 7 wherein said compound of formula I and said $CO_2$ together comprise at least about 5% by weight of the blowing agent.

9. A foamable composition comprising the blowing agent of claim 8.

10. A method of replacing an existing refrigerant contained in a refrigerant system comprising removing at least a portion of said existing refrigerant from said system and replacing at least a portion of said existing refrigerant by introducing into said system a refrigerant composition comprising a composition of claim 1.

11. The method of claim 10 wherein said existing refrigerant system comprises at least a first compressor having a first displacement and further comprising the step of removing said first compressor from the system and inserting in said system at least a second compressor having a larger displacement than said first compressor.

12. A sprayable composition comprising a material to be sprayed and a propellant comprising the composition of claim 1.

13. The sprayable composition of claim 12 in the form of an aerosol.

14. The sprayable composition of claim 12 wherein said material to be sprayed is selected from the group consisting of cosmetics, cleaning solvent, lubricants and medicinal materials.

15. A method of sterilizing an article comprising contacting said article with a composition comprising the composition of claim 1.

16. The composition of claim 1 in the form of a heat transfer fluid having a refrigeration capacity substantially matching that of R-22.

17. The composition of claim 1 in the form of a heat transfer fluid having a refrigeration capacity substantially matching that of R-407C.

18. The composition of claim 1 in the form of a heat transfer fluid having a refrigeration capacity substantially matching that of R-410A.

19. The composition of claim 1 comprising from about 5 to about 35 percent by weight of carbon dioxide ($CO_2$) and from about 65 to about 95 percent by weight of one or more compounds of Formula I.

* * * * *